United States Patent [19]
Lorbek

[11] Patent Number: 5,975,243
[45] Date of Patent: Nov. 2, 1999

[54] JAMMING DEVICE FOR ROPE AND ALIKE

[76] Inventor: Jože Lorbek, Mirna Pot 6, 6310 Izola, Slovenia

[21] Appl. No.: 08/973,767
[22] PCT Filed: Jun. 6, 1996
[86] PCT No.: PCT/SI96/00014
§ 371 Date: Dec. 8, 1997
§ 102(e) Date: Dec. 8, 1997
[87] PCT Pub. No.: WO96/41658
PCT Pub. Date: Dec. 27, 1996

[30] Foreign Application Priority Data

Jun. 8, 1995 [DE] Germany ............................ 195 20 860

[51] Int. Cl.⁶ ....................................................... A62B 1/14
[52] U.S. Cl. ............................................ 182/193; 182/192
[58] Field of Search ..................................... 182/193, 192, 182/5; 188/65.5

[56] References Cited

U.S. PATENT DOCUMENTS 5,597,053  1/1997  Rogleja ..................................... 182/193

Primary Examiner—Alvin Chin-Shue
Attorney, Agent, or Firm—Abelman, Frayne, & Schwab

[57] ABSTRACT

Jamming devices for rope comprise a casing (2) consisting of two pallely, one above the other situated flanges (3, 4) between which are perpendicularly mounted the first and the second pulleys (12, 13) as well as a jamming cleat (14). The second pivoting pulley (13) is fastened to the lever (11); the latter is pivoted eccentrically to centre of the pivoting pulley (13) and can be swayed to and fro within the limits determined by the design. The second pivoting pulley (13) is in functional relationship with the fixed pulley (15) and so the rope (10) can be wedged between the fixed pulley (15) and the second pivoting pulley (13) in the first jamming position. The lever (11) can be by means of the arc-adjuster (16) moved away from the fixed pulley (15). In functional relationship with the jamming cleat (14) is the press-boss (17); between the latter and the jamming cleat (14) the rope (10) can be wedged in the second jamming position. Thereby is warranted that the user, who hangs on the rope (10) threaded through the jamming device (1), can safely descend and/or ascend along the rope.

11 Claims, 5 Drawing Sheets

JAMMING DEVICE FOR ROPE AND ALIKE

BACKGROUND OF THE INVENTION

1. Field of the Invention

The invention concerns a jamming device for rope and alike whose casing consists of two parallelly, one above the other, situated flanges. Between the said flanges are perpendicularly mounted two pivoting pulleys and a jamming cleat.

A similar jamming device, used chiefly in alpinism for ascending and descending along the rope, is known under FR-PS 2,451,752. On at least one of its flanges are mounted a first and a second pivoting pulleys, by means of which occurs during ascending and/or descending a relative motion between the rope and the said pulleys.

Fastened to the casing is also a fixed pulley along which is wound the rope. To effect a jamming position between the fixed pulley and the first pivoting pulley is the fixed pulley in functional relationship with the first pivoting pulley. The latter, however, is coupled with the operating handle which is pivotally mounted between the two flanges. The first pivoting pulley is additionally equipped with two bosses facing the fixed pulley. These bosses wedge, in association with the fixed pulley, the rope in two jamming positions.

To make threading of the rope into the jamming device easier is one of the flanges retractable, thus allowing the rope to be wound around the pivoting pulleys and in particular between the first pivoting pulley and the fixed pulley.

If the user wishes to descend he embraces the handle with hand and pushes it in the middle position. A relative motion between the rope and the individual components of the jamming device ensues when neither of the first pivoting pulley's bosses blocks the rope between the said bosses and the fixed pulley—that is to say, when the rope is allowed to slide smoothly between the first fixed pulley and the first pivoting pulley. The first jamming position is activated by pressing the handle against the casing. Thus the user causes the first boss of the first pivoting pulley to edge the rope between the first pivoting pulley and the fixed pulley.

The second jamming position is activated by pushing the handle away from the casing until the angle of about 90° has been reached; then the rope is wedged between the second boss of the first pivoting pulley and the fixed pulley.

If the user releases the operating handle he causes the first pivoting pulley to rotate anti-clockwise until the operating handle gets pressed closely against the casing. The weight of user's body namely effects in the first pivoting pulley a moment of anti-lockwise rotation, activating so automatically the first jamming position of the rope.

A drawback of the jamming device under consideration is the occurrence that the first jamming position of the rope gets activated only when the operating handle is pressed firmly against the casing. Therefore the user is forced to remove the fingers he has between the handle and the casing, and then press with hand the handle against the casing if he wishes to wedge the rope safely in the first jamming position. If it happens—say, in the case of accident—that the user is unable to press the handle against the casing, the moment of rotation generated in the first pivoting pulley will activate the first jamming position in which the rope is wedged between the first boss and the fixed pulley. However, the weak point of this first jamming position is that it does not wedge the rope safely, for the jamming force generated by the first boss and the fixed pulley depends on the moment of rotation created in the first pivoting pulley as well as on the magnitude of force of friction between the rope, the fixed pulley and the boss. If the jamming force is smaller than the force of friction the jamming device does not hold the user firmly in place, and thus he slides downwards. This happens particularly if the rope's diameter is too small and/or the rope's surface is too smooth.

As to the second jamming position, its disadvantage is that the required angle between the handle and the casing is about 90°. This implies that great physical strength is required from the user not only to activate the second jamming position but also to retain it, for he has to overpower all the time the moment of rotation generated by the weight of user's body in the first pivoting pulley.

The said large opening angle of 90° has for the user another adverse consequence: the contact of user's hand with the casing gets lost immediately after the opening angle of the handle has reached the distance exceeding the span of his hand.

BRIEF SUMMARY OF THE INVENTION

The purpose of invention is to produce a jamming device that will offer safe descending and/or ascending along the rope threaded through the jamming device, provide fast and easy inserting of the rope, and require a small opening angle between the handle and the casing. Accordingly, the user's hand will remain in permanent contact with the handle and the casing—which means that the user will not be forced to remove his hand when operating the device.

Further shall the jamming device provide at least one jamming position in which the rope will be—regardless of the user's condition, that is to say, even if he has fainted away—automatically wedged safely. Thus in the case of a fall the user will not be in danger to slide downwards along the rope wound through the device; moreover, the thickness and properties of the rope's surface will have no impact on effectiveness of the jamming position.

The purpose of the invention has been achieved in the following way:

The second pivoting pulley is fastened to a lever that is pivoted eccentrically to the centre of the first pivoting pulley; around the said pivot the lever can be swayed to and fro.

Associated with the second pivoting pulley is a fixed pulley; between the latter and the second pivoting pulley is the rope wedged in the first jamming position.

The lever can be by means of an arc-shaped adjuster moved away from the fixed pulley.

Associated with the jamming cleat is a press-boss; between the latter and the jamming cleat is the rope wedged in the second jamming position.

Notably, the lever is pivoted eccentrically to the geometrical axis of rotation of the first pivoting pulley whereby is in each position of the lever provided a lever-arm. Thus is the lever, owing to the weight of user's body, continuously driven towards the casing, irrespective of the rope's diameter and properties of the rope's surface.

The first pivoting pulley and the lever are coupled together, which is another distinguished feature of the jamming device for it simplifies its design. Fastening of the jamming cleat to the lever affords safe winding of the rope as well as a large jamming surface and therefore no major effort is required to wedge the rope safely between the jamming cleat and the press-boss. A prominent feature of the design is also that the angle between the handle and the casing cannot exceed 60° and thus the user's hand can remain in permanent contact with the handle and the casing respectively.

The centre of the second pivoting pulley is in vertical direction a little removed from the lever's axle which distance depends on positioning of the lever's axle as determined via design. Therefore a predetermined moment of rotation urges the second pivoting pulley to move towards the fixed pulley, which implies that for activating the second jamming position but a minor physical effort is required from the user. On the other hand, the first jamming position gets activated automatically, without application of any force; a minor physical effort is required merely to disengage the first jamming position. Moreover, the first jamming position offers to the user a high degree of safety for it gets activated automatically as soon as the user releases the handle—say, in the case of an accident.

Through the lever is established a mutual relationship between both pivoting pulleys and the jamming cleat, which is another characteristic feature of the design. However, it is also possible to separate the first pivoting pulley from the lever. Further, it is possible to locate the lever without the casing unless the lever's freedom is impeded by one of the flanges.

Additional distinguished design features of the invention are evident from the claims which follow.

BRIEF DESCRIPTION OF THE SEVERAL VIEWS OF THE DRAWING(S)

An example of jamming device conformable to the invention is shown subsequently by means of drawings. The individual drawings show:

FIG. 1: Elevation view of the jamming device with a flange on which are mounted two pivoting pulleys. They are mutually connected via a lever to which is fastened a jamming cleat. On the said flange is mounted also a fixed pulley to which is pivotally attached the operation handle equipped with an arc-shaped adjuster and a press-boss.

FIG. 2: Jamming device as in FIG. 1; shown is the first possibility of inserting the rope.

FIG. 3: Jamming device as in FIG. 1; shown is the second possibility of inserting the rope.

FIG. 4: Jamming device as in FIG. 1; shown is the first jamming position of the rope.

FIG. 5: Jamming device as in FIG. 1; shown is the second jamming position of the rope.

DETAILED DESCRIPTION OF THE INVENTION

Figure 1:
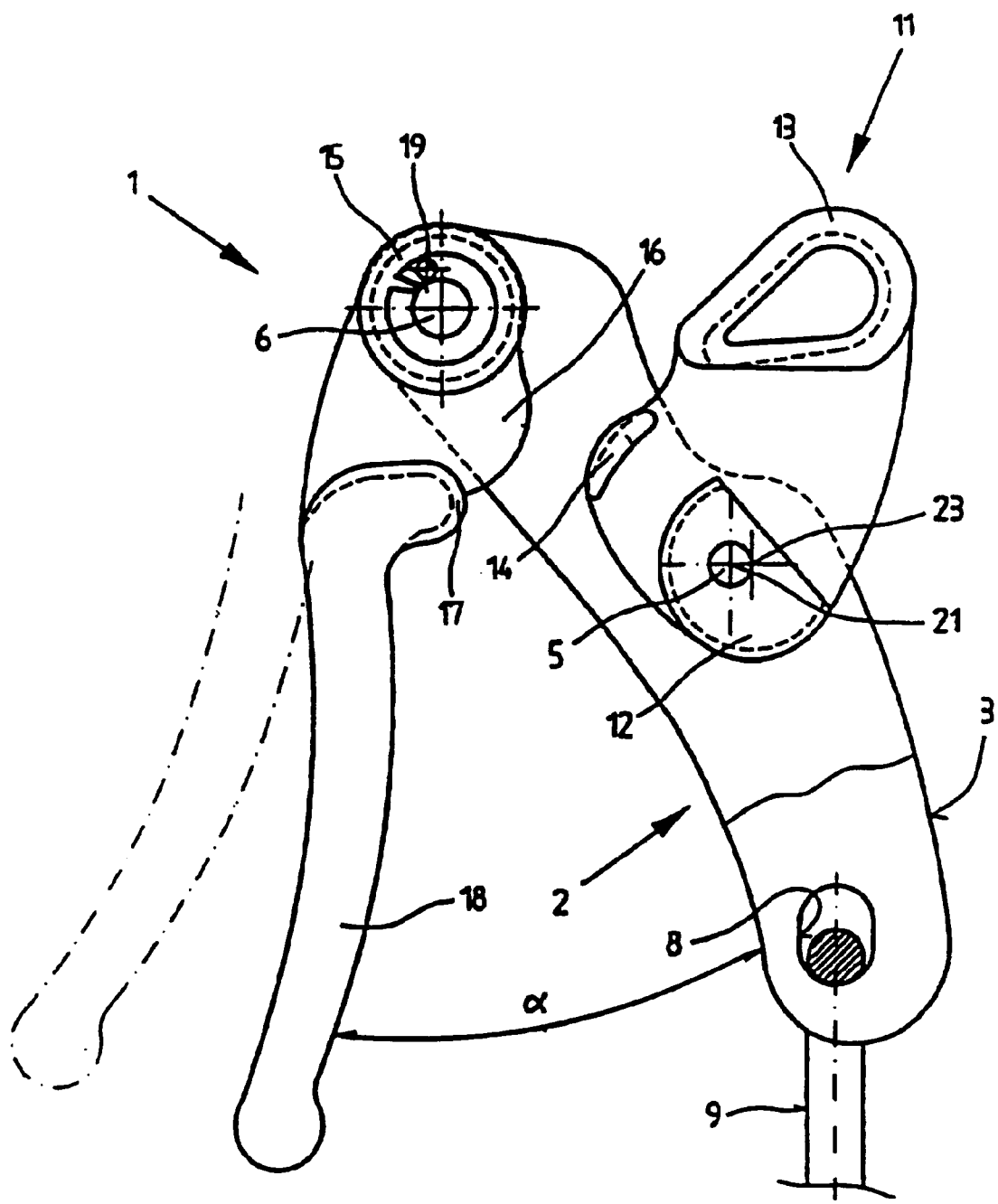

FIG. 1 shows the jamming device 1, comprising the casing 2 which consists of two flanges 3 and 4; flange 4 is not shown in the drawing.

Flanges 3 and 4 are fastened together with bolts 5 and 6, whereby is fixed the distance, determined via design, between the flanges 3 and 4. Bolt 5 serves also as axle 21 of the lever 11. In the shown example of the device are to the lever 11 fastened two pivoting pulleys 12, 13 and the jamming cleat 14.

The second pivoting pulley 13 has the shape of a droplet whose point faces the jamming cleat 14. One flank of the pivoting pulley 13 is turned towards the fixed pulley 15, which is via bolt 6 mounted between flanges 3 and 4.

The jamming cleat 14 is kidney-shaped, which gives it within its reach the maximal surface matching the rope 10. The fixed pulley 15 has a circular form.

The lever 11 can be by means of the arc-shaped adjuster 16 pushed out of the casing 2. Under the arc-shaped adjuster 16, at the side turned away from the fixed pulley 15, is situated a press-boss 17. To make handling easier are the arc-shaped adjuster 16 and the press-boss 17 extended by the handle 18.

Partial cross-section of the fixed pulley 15 in FIG. 1 shows the arc-shaped adjuster 16 which is equipped with a rotation stop 19. The latter restrains the movement of the arc-shaped adjuster 16, press-boss 17 and handle 18. In view of that is magnitude of the angle $\alpha$ between the handle 18 and the casing 2 limited to about 60°. This angle matches, by and large, the normal size of human hand and so even at maximal magnitude of the angle $\alpha$ four fingers of user's hand remain in contact with the casing 2, while the thumb remains in contact with the handle 18. Accordingly, if necessary, the user can press the handle 18 against the casing 2.

Either of the two flanges 3 and 4 has at the end turned away from the fixed pulley 15 an oblong hole 8 into which a carabiner 9 is fitted. The latter links, via rope which is not shown in the drawing, the user with the jamming device 1. Consequently, the jamming device 1 is permanently under the weight of user's body.

The way of handling the jamming device 1 is shown in FIGS. 2 to 5. Identical components of the device are consistently marked with the same numbers as in FIG. 1.

Figure 2:
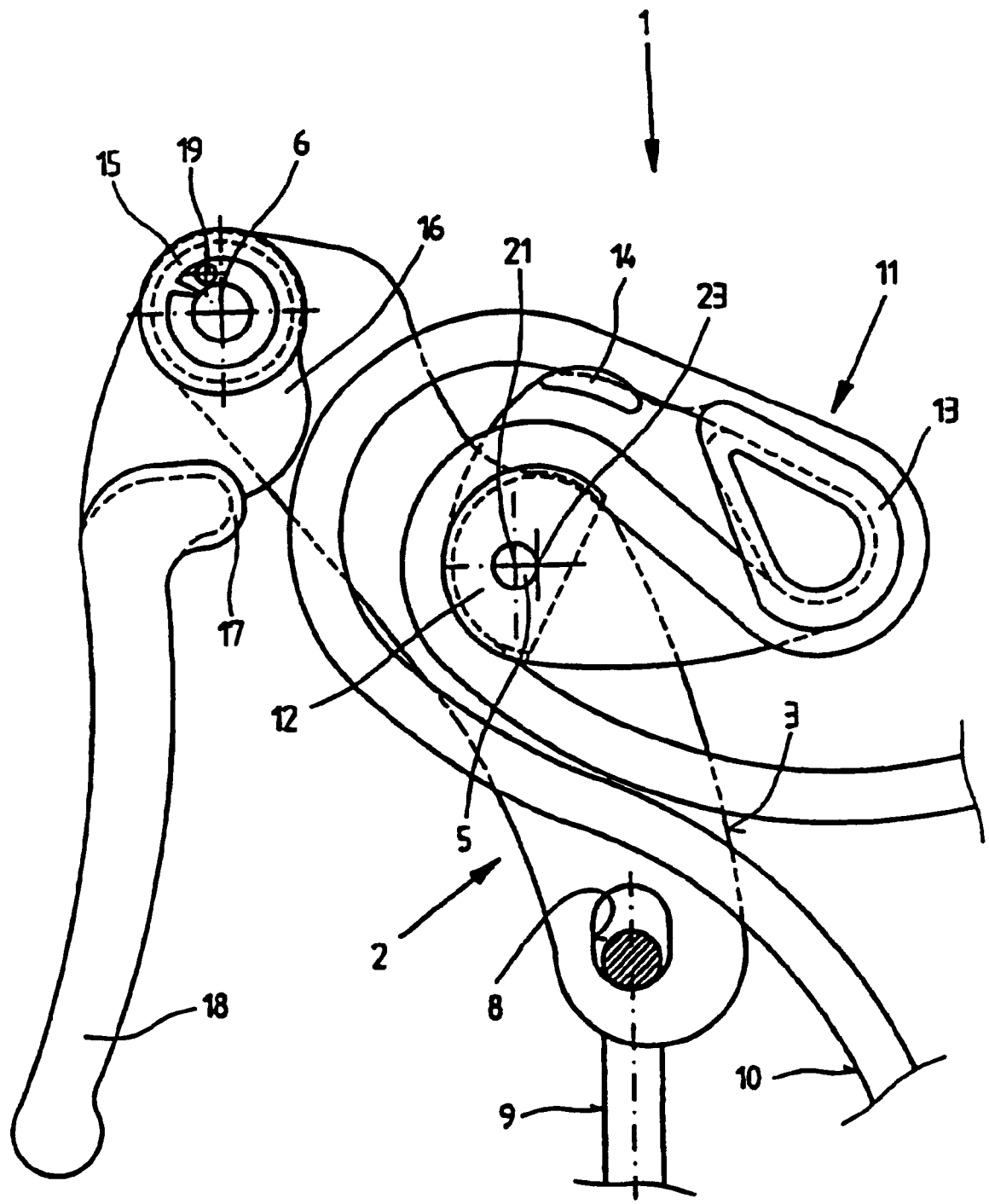

FIG. 2 shows the first possibility of inserting the rope 10. To facilitate this operation the user ought to sway the lever 11 out of the casing 2. Then winding of the rope 10 around the pivoting pulleys 12 and 13 is carried out easily and fast.

Figure 3:
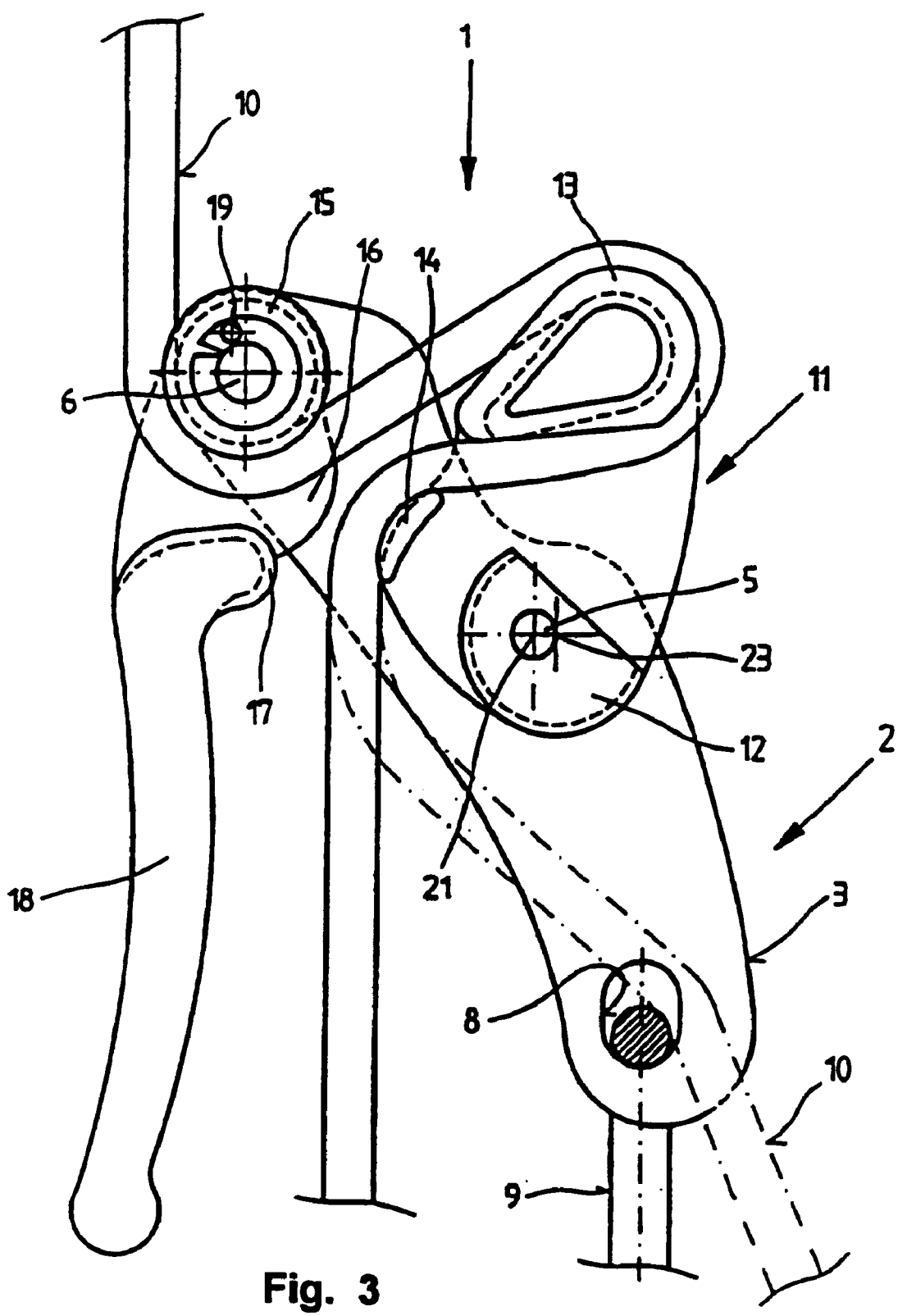

FIG. 3 shows the second possibility of inserting the rope 10. In this case the latter is threaded into the casing 2 under the fixed pulley 15. This alternative permits use of a thicker and less flexible rope 10 which is of consequence in the case the user does not possess a suitable rope 10 that could be threaded into the jamming device 1 as shown in FIG. 1.

Both alternatives of inserting the rope 10 have a common characteristic: in either case is the rope 10 wound almost entirely around the droplet-shaped pivoting pulley 13. Owing to its specific shape the pivoting pulley 13 offers, in association with the fixed pulley 15, such a large matching surface for the rope 10 that its thickness and properties of its surface have little impact, if any, on the respective jamming position.

Figure 4:
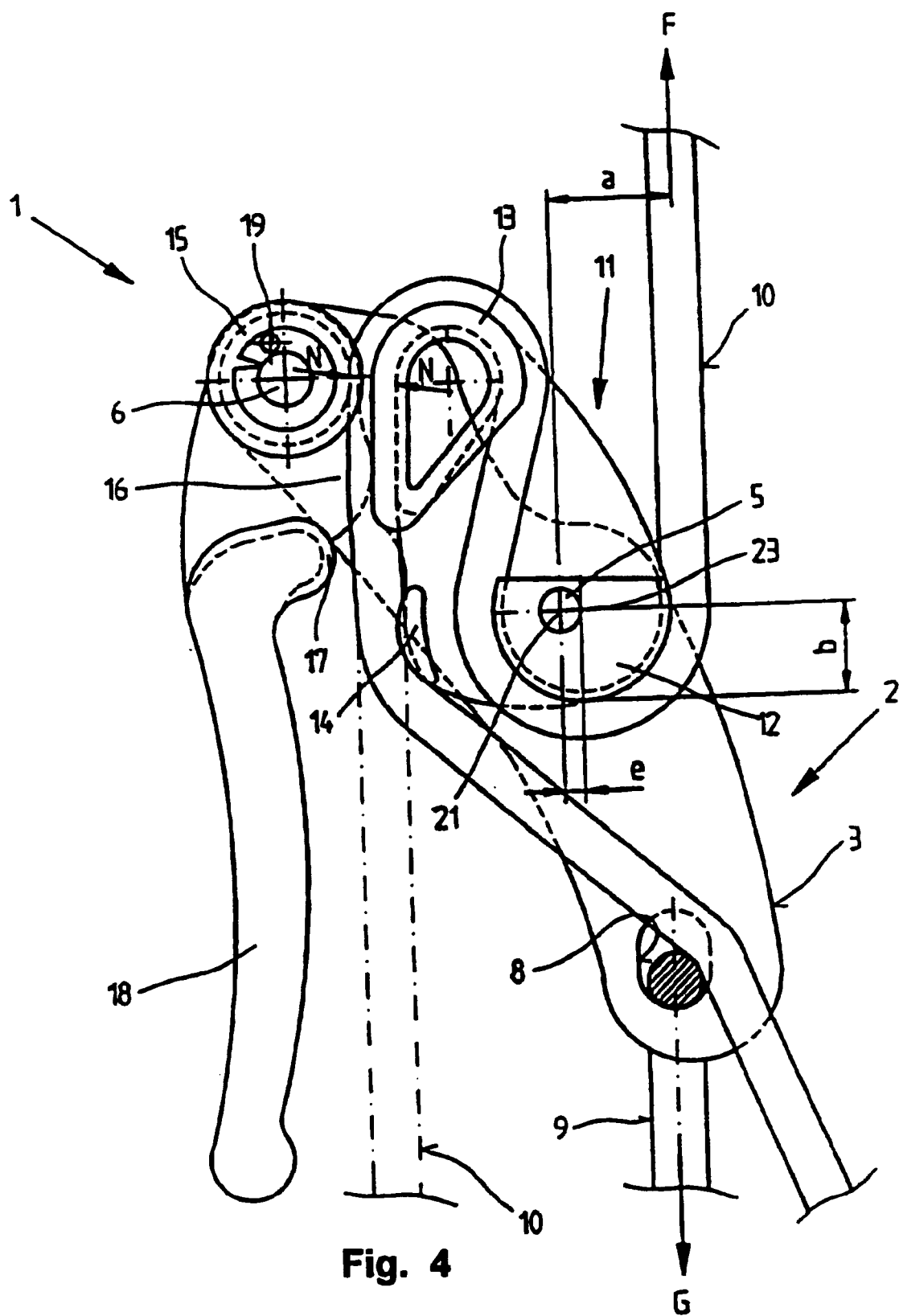

The first jamming position, where the rope 10 is wedged between the pivoting pulley 13 and the fixed pulley 15, is shown in FIG. 4. This first jamming position is activated automatically by the lever 11 through the force generated in rope 10 by the weight of user's body, which force moves the lever 11 towards the fixed pulley 15.

In FIG. 4 is this jamming position shown schematically by the help of arrows marked with N. These arrows N correspond to the normal force acting upon the rope 10 in this jamming position.

Movement of the lever 11, and simultaneously of the pivoting pulley 13, is brought about by the moment of rotation generated around the axle 21 of the lever 11. The said moment equals the product of the weight of user's body and the lever-arm a. The latter is the rectangular distance from the line of action of the force generated in rope 10 to the axle 21 of the lever 11. This moment of rotation is affected by another moment of rotation which also acts around the axle 21 of the lever 11. This second moment of rotation equals the product of force of friction, generated through joint action of the rope 10 with the pivoting pulley 12, and the lever-arm b. The lever-arm b corresponds to the radius at which the rope 10 encircles the axle 21 of the lever 11.

To ensure that in each position of the lever 11 a sufficient moment of rotation urges the lever 11 to move towards the fixed pulley 15—regardless of the weight of user's body, diameter of the rope and properties of rope's surface—is the axle 21 of the lever 11 positioned eccentrically to the geometrical axis of rotation of the pivoting pulley 12.

The arc-shaped adjuster 16 works in this first jamming position in association with the lever 11; thus by pushing the arc-shaped adjuster 16 towards the fixed pulley 15 the user moves the lever 11 away from the fixed pulley 15. In view of that the distance between the fixed pulley 15 and the pivoting pulley 13 increases until the jamming position is released and the rope 10 set free.

Motion of the lever 11 can be controlled by means of the convex curve incorporated in the arc-shaped adjuster 16 and so the user is able to increase the cross-section between the fixed pulley 15 and the pivoting pulley 13, by appropriate movement of the arc-shaped adjuster 16, slowly and uniformly.

The first jamming position represents also a safety measure for it gets engaged automatically—that is to say, the user does not have to apply any force on the handle 18. For instance, if the user has fainted away and is therefore not in the position to handle the jamming device 1, then the latter will wedge the rope 10 automatically in the first jamming position, thus preventing the user from falling down.

Figure 5:
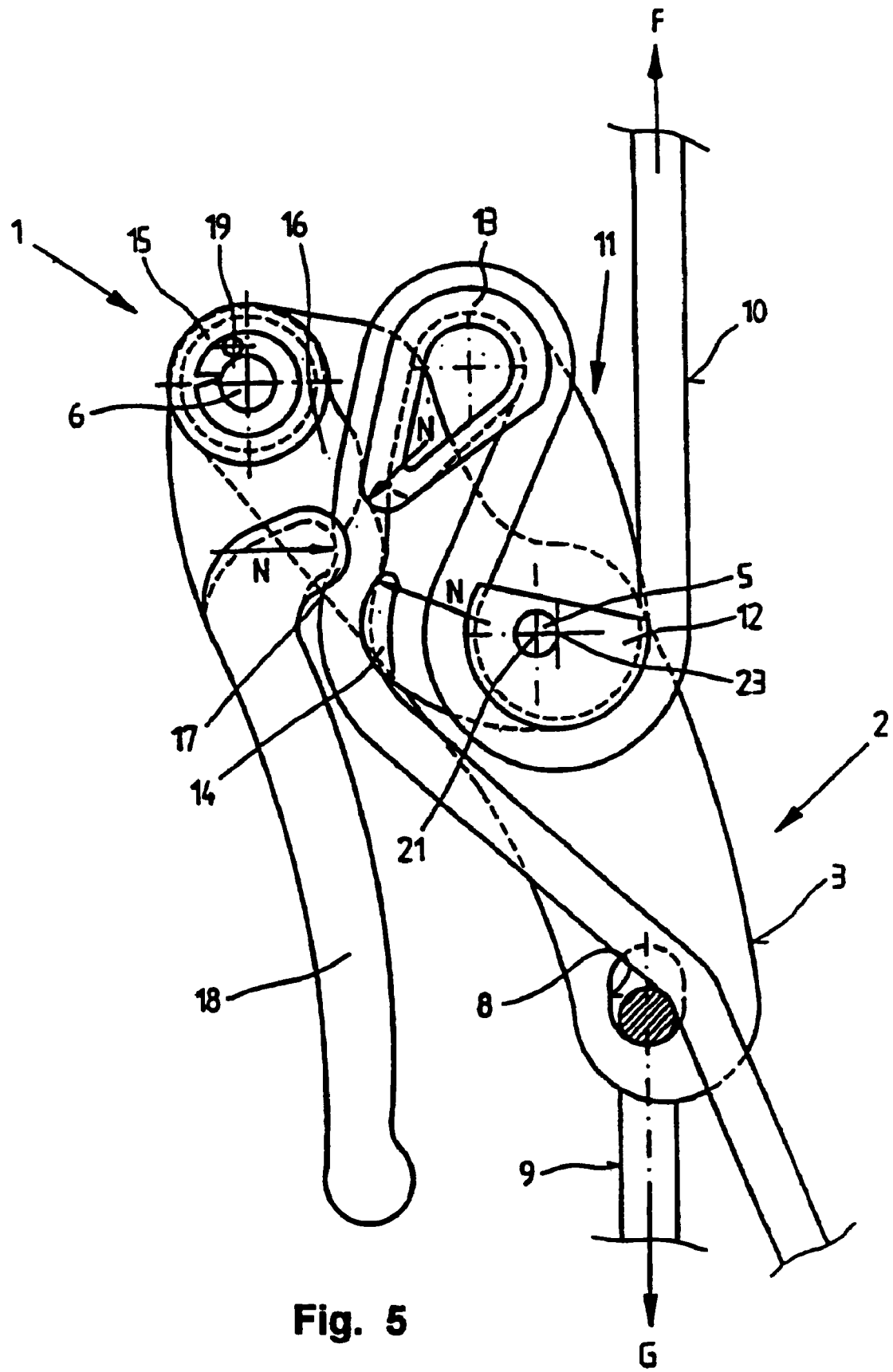

The second jamming position is shown in FIG. 5. In this position act upon the rope 10 three normal forces which are schematically represented by arrows N.

The press-boss 17 is in this case pushed towards the jamming cleat 14; thus the rope 10 gets wedged between the press-boss 17 and the jamming cleat 14. As the pivoting pulley 13 has the form of a droplet whose point faces the jamming cleat 14, represents the said point of the pivoting pulley 13 a boss as well. Consequently, the rope 10 is in the form of S three times wedged between the pivoting pulley 13, jamming cleat 14, and the press-boss 17. To prevent, while pressing the handle 18, the rope 10 from being jammed between the casing 2 and the handle 18, the rope 10 is threaded out of the casing 2 at the side turned away from the handle 18. Thereby acts the carabiner 9 as the guiding agent for the rope 10.

I claim:

1. A jamming device for rope and the like, comprising:
   a. a casing, said casing comprising two parallel flanges;
   b. a first pivoting pulley (12), a second pivoting pulley (13), a fixed pulley (15), and a jamming cleat (14), the first pivoting pulley (12), the second pivoting pulley (13), and the jamming cleat (15) being mounted between the two parallel flanges of the casing;
   c. a lever to which is fastened the first pivoting pulley (12), the second pivoting pulley (13), and the jamming cleat (14);
   d. an arc-shaped adjuster (16), the arc-shaped adjuster (16) being attached to the fixed pulley (15), and being capable of moving the lever (11) away from the fixed pulley (15); and
   e. a press-boss (17) attached to the arc-shaped adjuster (16); the second pivoting pulley (13) and the fixed pulley (15) being capable of wedging a rope (10) between the second pivoting pulley (13) and the fixed pulley (15) in a first jamming position; the jamming cleat (14) and the press-boss (17) being capable of wedging the rope (10) between the jamming cleat (14) and the press-boss (17) in a second jamming position.

2. Jamming device according to claim 1, characterized in that the lever (11) is pivoted eccentrically to the geometrical centre of the first pivoting pulley (12).

3. Jamming device according to claim 1, characterized in that the jamming cleat (14) is situated between the first pivoting pulley (12) and the second pivoting pivoting pulley (13).

4. Jamming device according to claim 1, characterized in that the arc-shaped adjuster (16) and the press-boss (17) are equipped with an operating handle (18).

5. Jamming device according to claim 4, characterized in that the arc-shaped adjuster (16) is mounted pivotally in the centre of the fixed pulley (15).

6. Jamming device according to claim 1, characterized in that an opening angle ($\alpha$) of the arc-shaped adjuster (16), owing to a rotation stop (19), can not exceed 60°.

7. Jamming device according to claim 1, characterized in that the second pivoting pulley (13) has the form of a droplet whose point is oriented towards the jamming cleat (14), while one of its flanks faces the fixed pulley (15).

8. Jamming device according to claim 1, characterized in that the jamming cleat (14) has the form of kidney.

9. Jamming device according to claim 7, characterized in that by the help of the press-boss (17) the rope (10) can be wedged in a form of an S between the jamming cleat (14) and the second pivoting pulley (13).

10. Jamming device according to claim 1, characterized in that the arc-shaped adjuster (16), is furnished with a convex curve by means of which it is possible to adjust continuously the motion of the lever (11) and thus keep it under control.

11. Jamming device according to claim 1, characterized in that either of the flanges (3 and 4) has at an end turned away from the fixed pulley (15) an oblong hole (8) into which a carabiner (9) can be fitted.

* * * * *